United States Patent
Talari et al.

(10) Patent No.: US 10,515,318 B2
(45) Date of Patent: Dec. 24, 2019

(54) AUTOMATED RESOLUTION OF WI-FI CONNECTIVITY ISSUES OVER SMS

(71) Applicant: Fortinet, Inc., Sunnyvale, CA (US)

(72) Inventors: Samuel Stephen Talari, Bangalore (IN); Lakshmi Narayana Dronadula, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 158 days.

(21) Appl. No.: 15/283,277

(22) Filed: Sep. 30, 2016

(65) Prior Publication Data

US 2018/0098233 A1    Apr. 5, 2018

(51) Int. Cl.
| | |
|---|---|
| *H04W 4/14* | (2009.01) |
| *G06N 20/00* | (2019.01) |
| *H04L 29/12* | (2006.01) |
| *H04L 12/24* | (2006.01) |
| *H04L 12/26* | (2006.01) |
| *H04W 48/10* | (2009.01) |
| *H04W 88/18* | (2009.01) |
| *H04L 12/58* | (2006.01) |
| *G06N 3/08* | (2006.01) |

(52) U.S. Cl.
CPC ........... *G06N 20/00* (2019.01); *H04L 41/069* (2013.01); *H04L 41/16* (2013.01); *H04L 43/0811* (2013.01); *H04L 61/6022* (2013.01); *H04W 4/14* (2013.01); *H04W 48/10* (2013.01); *G06N 3/08* (2013.01); *H04L 51/08* (2013.01); *H04L 51/38* (2013.01); *H04W 88/18* (2013.01)

(58) Field of Classification Search
None
See application file for complete search history.

(56) References Cited

U.S. PATENT DOCUMENTS

| | | | | |
|---|---|---|---|---|
| 2003/0224797 A1* | 12/2003 | Kuan | ...................... | H04L 43/00 455/446 |
| 2007/0197206 A1* | 8/2007 | Olson | ...................... | H04L 41/06 455/423 |
| 2014/0130111 A1* | 5/2014 | Nulty | ................... | H04N 17/004 725/107 |

(Continued)

OTHER PUBLICATIONS

"Station (networking)", Wikipedia entry, Jul. 18, 2017 [retrieved on Jun. 5, 2018]. Retrieved from the Internet: <URL:https://en.wikipedia.org/wiki/Station_(networking)>.*

*Primary Examiner* — Esther B. Henderson
*Assistant Examiner* — Dae Kim
(74) *Attorney, Agent, or Firm* — Law Office of Dorian Cartwright; Dorian Cartwright (57) ABSTRACT

Wi-Fi connectivity issues are automatically resolved over SMS. An SMS message including a MAC address is received for a station having a wireless connectivity issue involving a Wi-Fi portion of the data communication network. The SMS message is converted according to an API (application programming interface) of the network manager. Error logs are retrieved according to the MAC address. Based on the error logs, a connectivity solution (or other type of solution) to the connectivity issue is determined. The connectivity solution from the network manager API to an SMS message. The SMS message with the connectivity solution is sent to the station. Subsequent SMS messages are sent to the station to determine whether the connectivity solution was effective in improving a client experience.

8 Claims, 6 Drawing Sheets

(56) References Cited

U.S. PATENT DOCUMENTS

| | | | |
|---|---|---|---|
| 2015/0269586 A1* | 9/2015 | Garia | G06Q 30/016 705/304 |
| 2016/0078142 A1* | 3/2016 | Gorny | G06Q 30/01 707/748 |
| 2016/0164930 A1* | 6/2016 | Hua | H04L 65/403 370/260 |
| 2016/0205697 A1* | 7/2016 | Tan | H04W 24/02 370/329 |
| 2016/0242053 A1* | 8/2016 | Leontiadis | H04L 41/065 |
| 2017/0155547 A1* | 6/2017 | Lockyer | H04L 41/0677 |

\* cited by examiner

AUTOMATED RESOLUTION OF WI-FI CONNECTIVITY ISSUES OVER SMS

FIELD OF THE INVENTION

The invention relates generally to computer networking, and more specifically, to resolving user connectivity issues over SMS (short messaging service).

BACKGROUND

More and more often, Wi-Fi networks are being used in mission critical applications, such as administration of exams at educational institutions, health monitoring at hospitals, and the like. Unfortunately, Wi-Fi networks are subject to various network problems including outages and downtime, lack of responsiveness, log-in problems, slow bandwidth, down network devices, and various errors.

One difficulty with station connectivity is that issues cannot be resolved if a network connection is not available to report the problem. It can be difficult to report problems over a telephone due to the complexity of identifying a user device by MAC number by voice. Furthermore, live operators are needed to answer telephones 24-hours a day which can add to support expenses.

Therefore, what is needed is a robust technique to resolve user connectivity issues over SMS.

SUMMARY

These shortcomings are addressed by the present disclosure of methods, computer program products, and systems for resolving user connectivity issues over SMS.

In one embodiment, an SMS message including a MAC address is received for a station having a wireless connectivity issue involving a Wi-Fi portion of the data communication network. Additionally, general connectivity issues, slow network performance, disconnections, application performance, and other client experience issues can be reported. The SMS message is converted according to an API (application programming interface) of the network manager.

In another embodiment, error logs are retrieved according to the MAC address. Based on the error logs, a connectivity solution (or other type of solution) to the connectivity issue is determined. The connectivity solution from the network manager API to an SMS message. The SMS message with the connectivity solution is sent to the station.

In other embodiments, subsequent SMS messages are sent to the station to determine whether the connectivity solution was effective in improving a client experience. Successes and failures are logged for future determinations. Failures can also spawn a group chat facilitated between users and network administrators.

Advantageously, computer network performance with respect to client experiences are improved. Moreover, wireless computer device Wi-Fi connectivity issues are reduced.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for resolving user connectivity issues over SMS. One of ordinary skill in the art will recognize many additional variations made possible by the succinct description of techniques below. For example, although SMS messages and error logs are used for purposes of illustrating detailed embodiments, other types of messaging channels (e.g., Bluetooth) and other types of logs (e.g., network activity logs) can be implemented as well.

Figure 1:
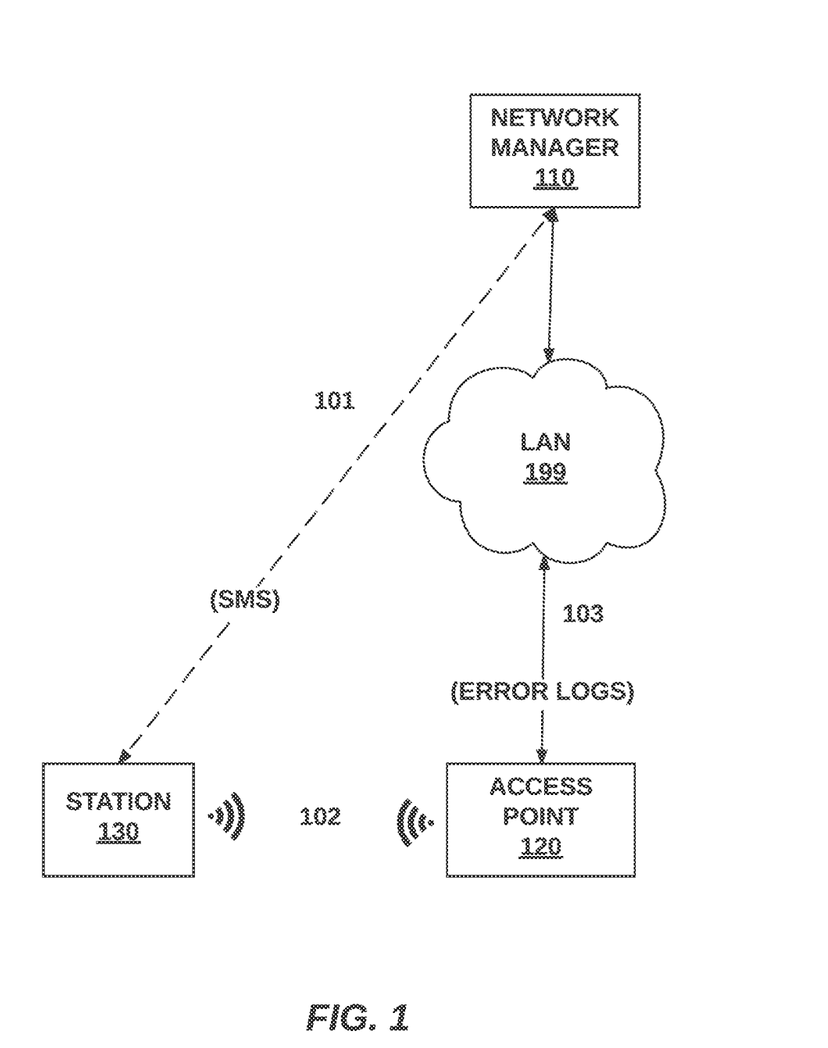
FIG. 1 is a high-level block diagram illustrating a system to resolve user connectivity issues over SMS, according to one embodiment.
Figure 2:
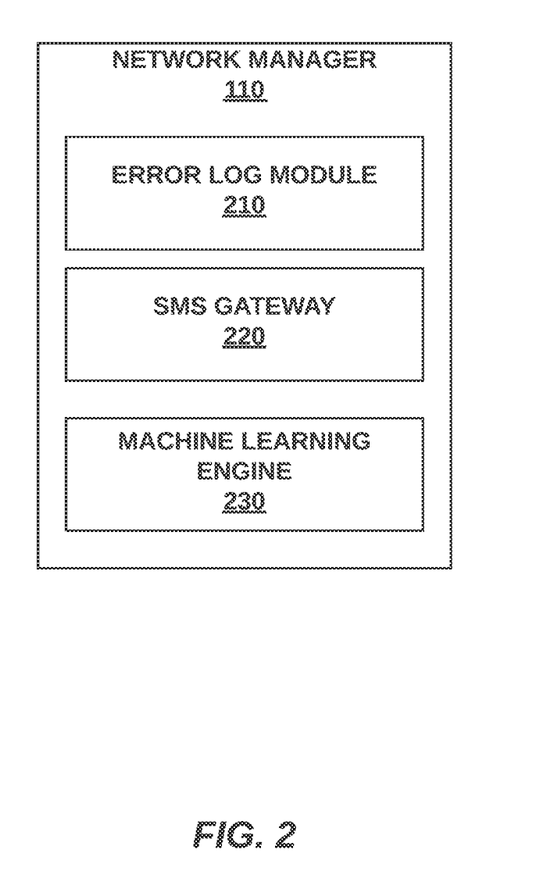
FIG. 2 is a more detailed block diagram illustrating a network manager of the system of FIG. 1, respectively, according to some embodiments.

Systems to Resolve User Connectivity Issues Over SMS (FIGS. 1-2)

FIG. 1 is a high-level block diagram illustrating a system to resolve user connectivity issues over SMS, according to one embodiment. The system 100 comprises a network manager 110, an access point 120 and a station 130. Many other components may also be present, such as more access points, more stations, controllers, firewalls, routers, switches, repeaters, servers, and the like. Additionally, components can be implemented with a single physical box, or, each could represent a cluster of physical boxes acting in coordination. The system 100 can be implemented locally as a LAN or be implemented in the cloud with certain components being remotely available (e.g., through a firewall).

The network manager 110 and the access point 120 are communicatively coupled to the LAN 199, preferably by a wired connection. The station 130 communicatively couples to the LAN 199 via the access point 120 by a wireless connection 102 when network connections are operating correctly. The station 130 also communicatively couples to the network manager by an SMS channel 101. The SMS channel 101 can be over a cell network using 3G, 4G or another cellular technology. In one embodiment, the SMS channel 101 comprises a data channel such as Bluetooth. Wi-Fi components can communicate using IEEE 802.11 protocols, including IEEE 802.11n and IEEE 802.11ac.

The network manager 110 responds to SMS messages form the station 130 to resolve connectivity issues. In one embodiment, sits atop a hierarchy of network components, having the authority to configure all subservient network components. Management can be initiated manually by a network administrator or be initiated automatically under network policies and responsive to real-time network conditions.

Additional embodiments of the network manager are set forth with respect to FIG. 2 below.

The access point 120, under ideal conditions, provides an on-ramp for the station 130 for utilizing the backbone network. When not under ideal conditions, the Wi-Fi channel 102 or the backbone channel 103 to the LAN 199 can be having performance issues. Additionally, the access point 120 itself can cause connectivity problems for the station 130. In one case, the access point 120 communicates with the network manager 110 over an SMS channel to report connectivity issues to the LAN 199. For example, a failed log in attempt by a specific user from a MAC address, due to invalid log in credentials is sent upstream.

In general operations, the access point 120 periodically transmits beacons to advertise services and available BSSIDs. Wireless stations within radio range may choose to join the network and send a probe request (or association request) to initiate the connection process. In turn, the access point 120 sends a probe response to facilitate in the connection process. As a result, the station 130 can reach resources on the LAN 199 and outside of the LAN 199.

The station 130 resorts to the SMS channel 101 when the wireless channel 102 is not performing as expected. In one case, a user can initiate while using a network application such as a browser or streaming application. A mobile app or mobile operating system can automatically recognize connectivity issues and gather appropriate information needed for communication to the network manager 110. In one case, a browser application automatically reports an HTTP 404 error to the network manager 110 in a manner that is transparent to users. An SMS application executing on the station 110 sends SMS messages for the mobile app or mobile operating system. The access point 120 can provide SMS contact information over the wireless connection 120, if available, using beacons or a special message responsive to connection errors. Alternatively, users manually compose a text message with appropriate identification data, such a MAC address of a specific device, a user name, a password, a physical location, a code describing an issue, or a natural language text message.

In general operations, the station 130 (either device, user, or application) selects the access point 110 from available access points within range, and initiates a connection. Users may be asked to enter one or more network credentials, server credentials, corporate credentials, application credentials, or the like.

Figure 6:
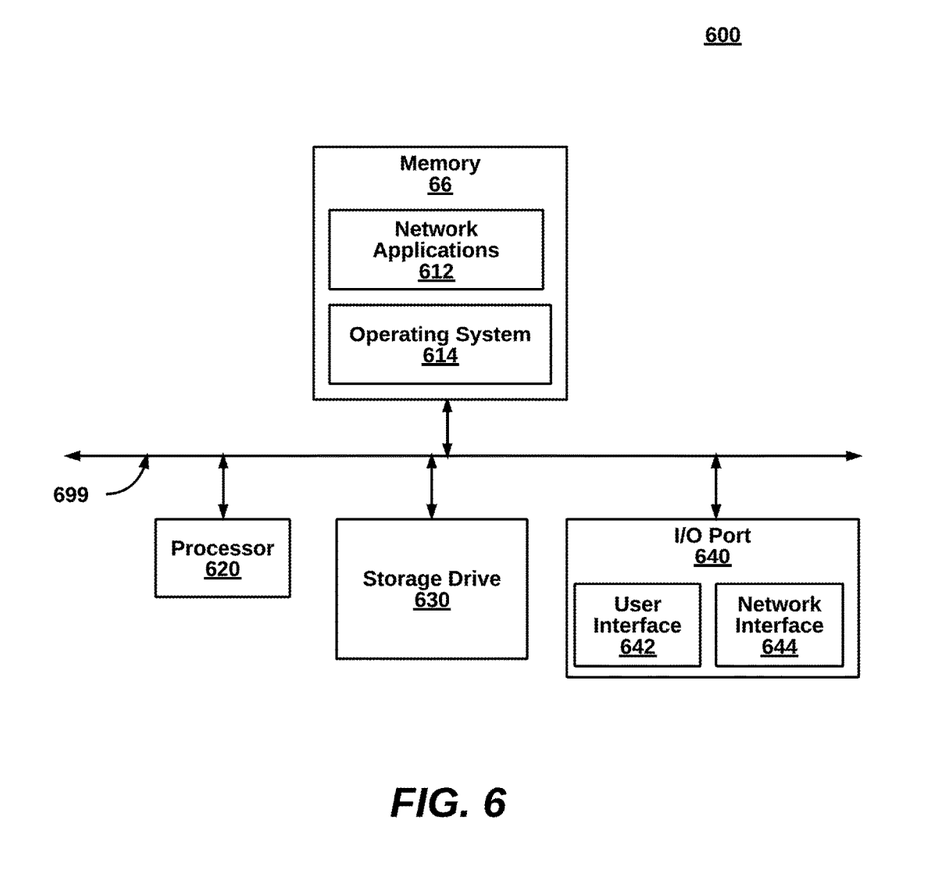
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating the network manager 110 of the system 100, according to one embodiment. The network manager 110 includes an error log module 210, an SMS gateway 220, and a machine learning engine 230. The components can be implemented in hardware, software, or a combination of both.

The error log module 210 receives error logs from the access point 120 and other network devices on the LAN 199, in an embodiment. In some embodiments, the error log module 120 comprises a SIEM (security information and event management) log manager, an example of which is disclosed in U.S. application Ser. No. 15/277,965 which is hereby incorporated by reference. In other embodiments, the error log module 120 communicates with an external log manager. In more detail, the access point 120 reports failed log on attempts, hard and soft hand-offs of connected stations, device and user non-compliance, network conditions and performance, and the like.

The SMS gateway 220 manages SMS messaging with and between the station 110, the network manager 120 and a network administrator. In one case, the access point 120 also communicates via SMS messages. A client experience protocol can be initiated when an SMS message is received from the station 110. SMS messages are parsed to recognize a MAC address and a connectivity issue (e.g., a specific issue, or an indication that an unknown issue exists) embedded within a data packet. Example SMS formats are 160 7-bit characters, 140 8-bit characters, or 70 16-bit characters. If the MAC address matches one or more error logs or activity logs, a user account, an entry on a BSSID table, or other network record, a sequence of subsequent messages can be tracked, as further described in FIG. 5 or otherwise. One embodiment of the SMS gateway 220 comprises the Twilio Platform for converting SMS messages according to an API of the network manager 110.

The machine learning engine 230 implements artificial intelligence to identify connectivity solutions for connectivity issues submitted from the SMS gateway 220. One embodiment includes an artificial neural network that adapts to one or more errors or events. Another embodiment uses pattern recognition to develop statistical models between connectivity issues and connectivity solutions. Statistics and analysis can also be received from the error log module 210 for self-configuration and self-reconfiguration. Hard rules that are inflexible can also be applied, such as those set by a network administrator. In one implementation, a subset of rules applies to connectivity issues.

Figure 3:
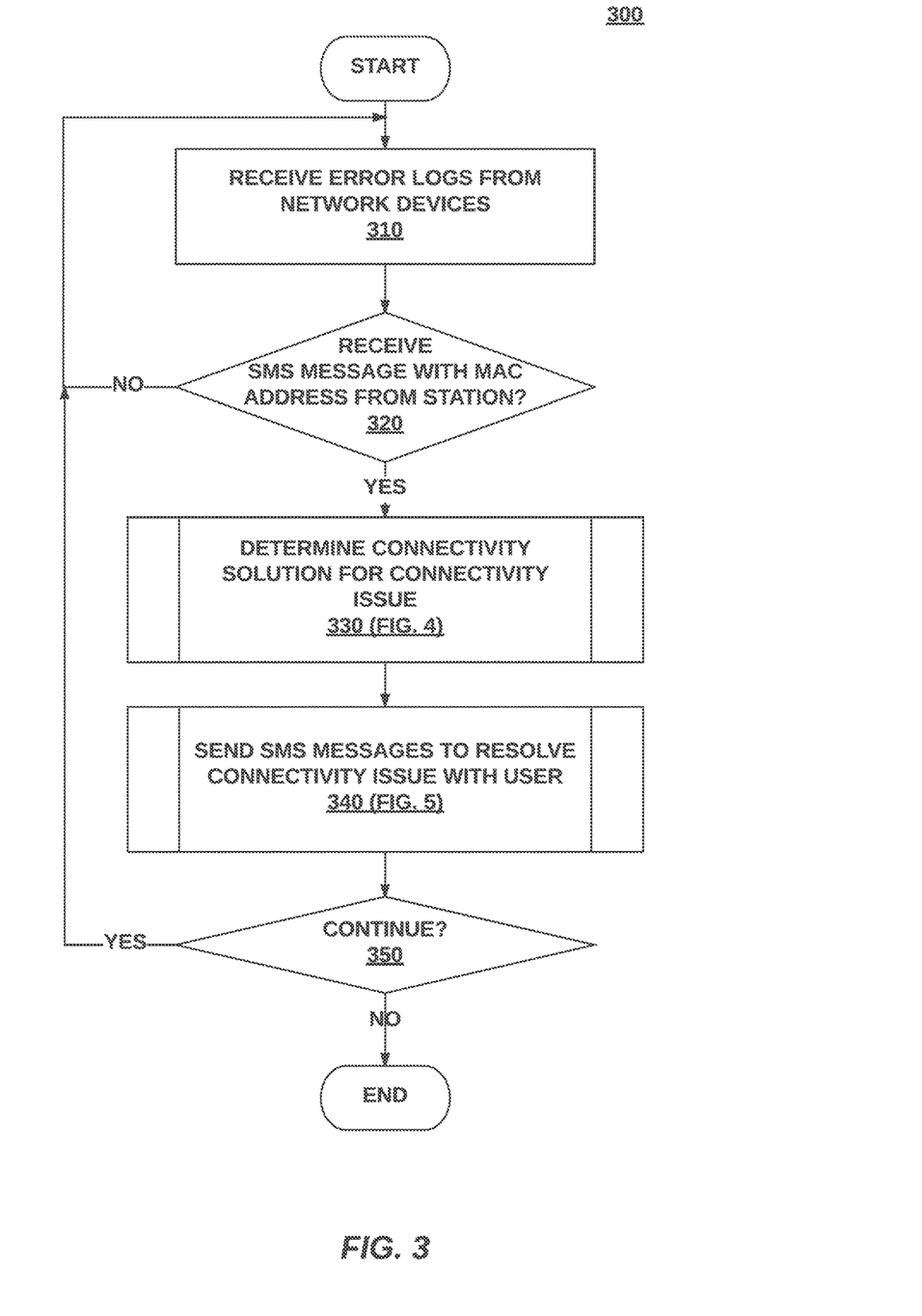
FIG. 3 is a high-level flow diagram illustrating a method for resolving user connectivity issues over SMS, according to one embodiment.
Figure 4:
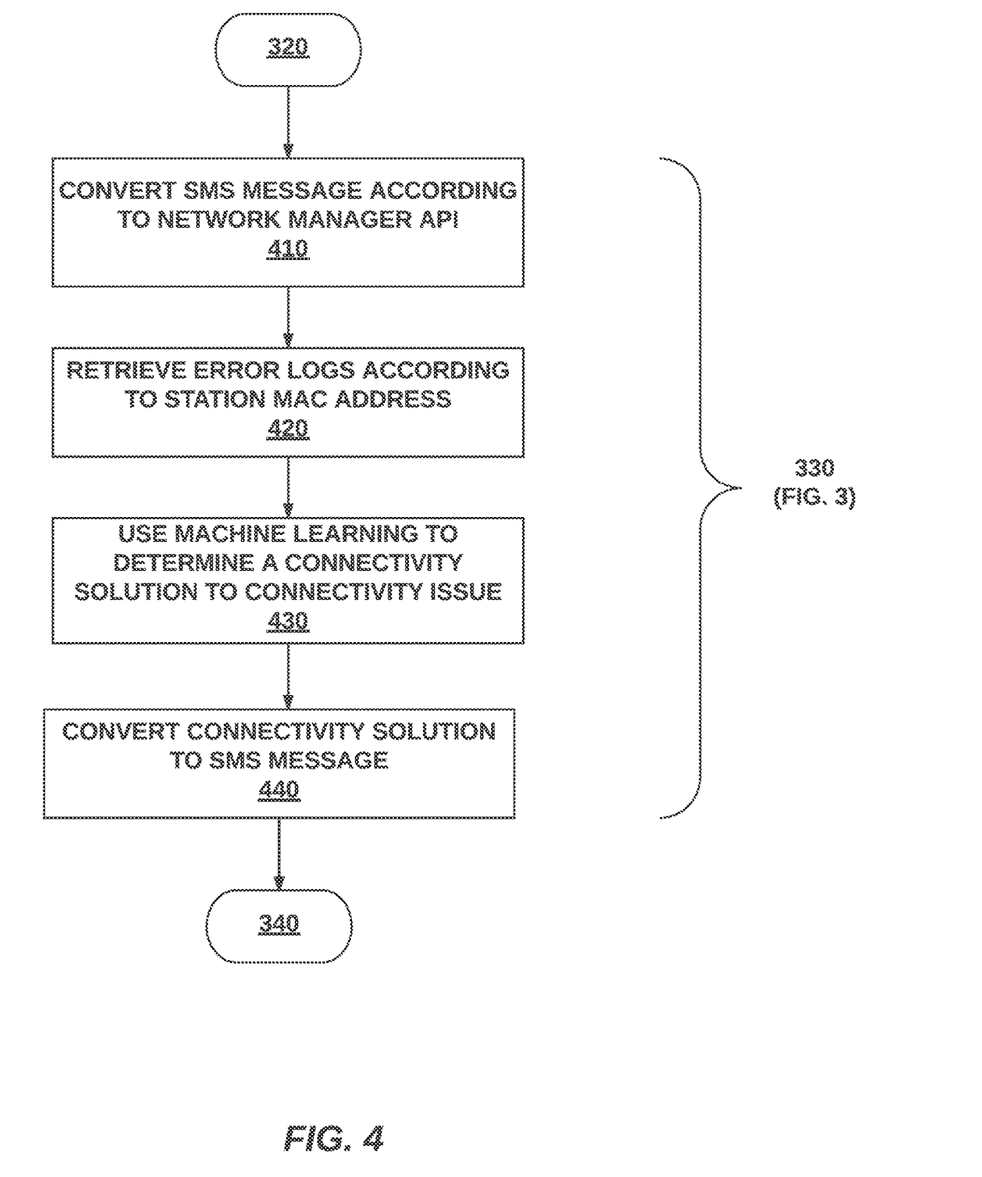
FIG. 4 is a more detailed flow diagram illustrating a step of determining connectivity solutions for connectivity issues from the method of FIG. 3, according to one embodiment.
Figure 5:
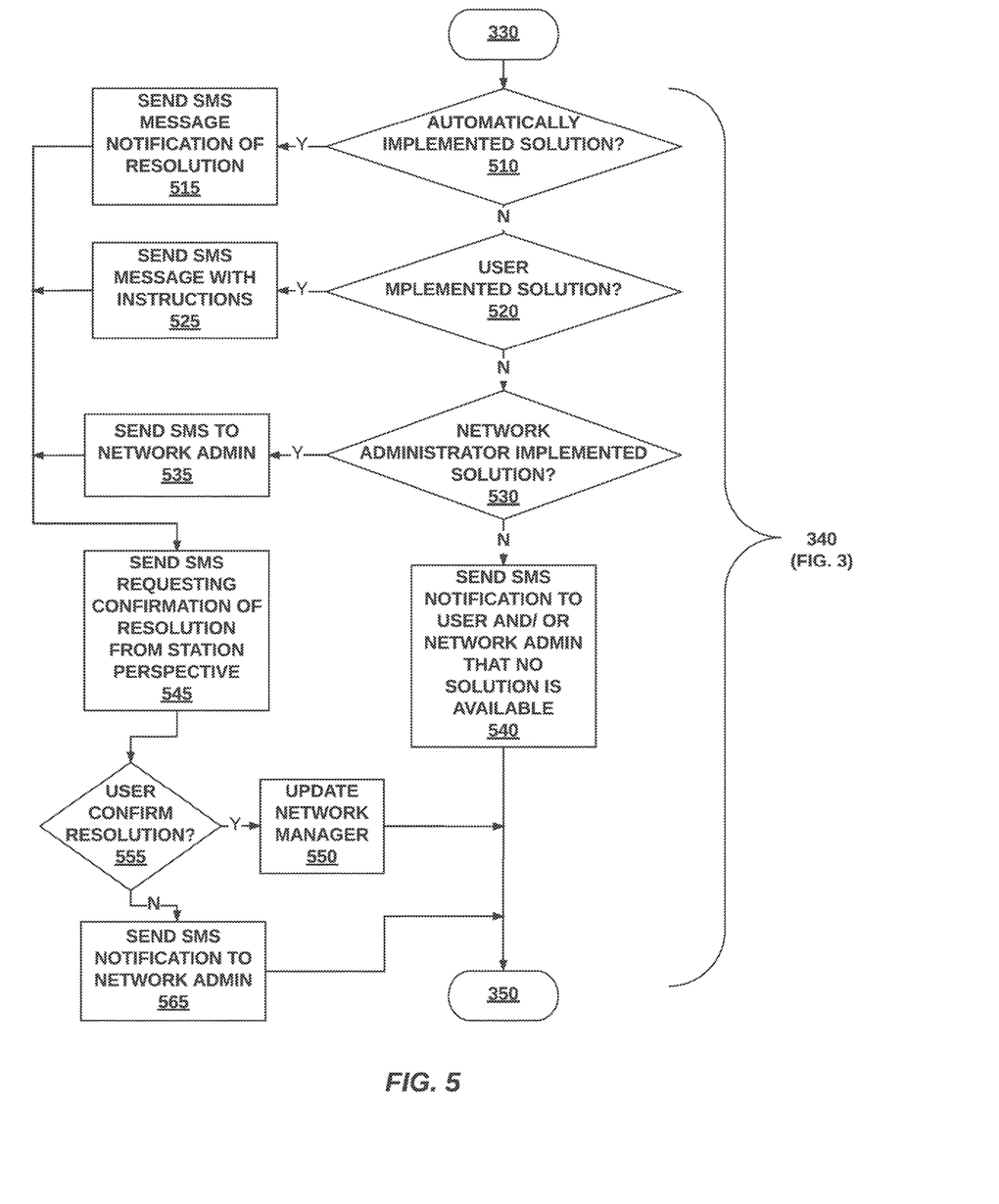
FIG. 5 is a more detailed flow diagram illustrating a step of sending SMS messages to resolve connectivity issue with user from the method of FIG. 3, according to one embodiment.

Methods Resolving User Connectivity Issues Over SMS (FIG. 3-5)

FIG. 3 is a high-level flow diagram illustrating a method for resolving user connectivity issues over SMS, according to one embodiment. One of ordinary skill in the art will recognize that the method 300 is non-limiting as other embodiments can have more or less steps and can be performed in a different order. In one embodiment, the method 300 is implemented in the system 100 of FIG. 1.

Error logs (or other network activity) is received from network devices (step 310). Responsive to receiving an SMS message with a MAC address (or other identification information) is received from the station (step 320), a connectivity solution for a connectivity issue is determined (step 330), as described in FIG. 4. The connectivity issue, or an indication thereof, can be included in the SMS message. Otherwise, the system resorts to error logs. SMS messages are sent back to the station or user to resolve connectivity issues (step 340), as detailed in FIG. 5. Some implementations automatically execute the connectivity solution at the station from the returned SMS message when recognized by a local mobile app.

FIG. 4 is a more detailed flow diagram illustrating the step 330 of determining connectivity solutions for connectivity issues from the method of FIG. 3, according to one embodiment.

An SMS message is converted according to a network manager API (step 410), for example, using the Twilio platform. Error logs are retrieved according to the station MAC address (or other identification information) (step 420). In one case, machine learning is used to determine a connectivity solution to a connectivity issue (step 430). The connectivity solution is converted to an SMS message.

FIG. 5 is a more detailed flow diagram illustrating the step 340 of sending SMS messages to resolve connectivity issue with user from the method of FIG. 3, according to one embodiment.

There are many different SMS protocols. In FIG. 5, solutions can be automatically implemented (step 510), user implemented (step 520), or network administrator implemented (step 530). A corresponding SMS message is sent to the user, including an SMS message notification of resolution (step 515), an SMS message with user instructions (step 525), or an SMS message indicating intervention needed by network administrator (step 535), accordingly.

After resolution (or partial resolution), an SMS message requesting confirmation of resolution from station, application or user perspective is sent (step 545). If user confirms resolution (step 555), machine learning or rules in a network manager is updated (step 550). If resolution is not confirmed (step 555), an SMS can be sent to a network administrator for follow-up. Machine learning or rules can also be updated for failures.

Generic Computing Device (FIG. 6)

FIG. 6 is a block diagram illustrating an exemplary computing device 600 for use in the system 60 of FIG. 1, according to one embodiment. The computing device 600 is an exemplary device that is implementable for each of the components of the system 60, including the SDN controller 16, the Wi-Fi controller 120, the access points 130A-N, and the stations 140A-N. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 66, a processor 620, a storage drive 630, and an I/O port 640. Each of the components is coupled for electronic communication via a bus 666. Communication can be digital and/or analog, and use any suitable protocol.

The memory 66 further comprises network applications 612 and an operating system 614. The network applications 612 can include the modules of the SDN controller 16, the Wi-Fi controller 120, or the access point 130, as illustrated in FIGS. 3-5. Other network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 66 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an instant or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a network manager device of a data communication network, implemented at least partially in hardware and for using machine learning for automatically resolving user Wi-Fi connectivity issues over SMS (short messaging service), the method comprising the steps of:
- receiving error logs, at a network interface of the network device manager, from a plurality of network devices on the data communication network, including a specific access point associated with the connectivity issue;
- using machine learning of the received error logs to determine connectivity solutions to connectivity issues;
- receiving, at the network interface, an SMS message including a MAC address for a specific station having a connectivity issue involving the specific access point;
- converting, with a processor of the network manager device coupled to the network interface, the SMS message according to an API (application programming interface) of the network manager;
- retrieving error logs based on the converted SMS message according to the MAC address, wherein the retrieved error logs comprise connectivity issues of stations on the Wi-Fi portion of the data communication network other than the specific station;
- based on the error logs from stations other than the specific station, looking up a connectivity solution to the connectivity issue for the specific station;
- converting the connectivity solution from the network manager API to an SMS message; and
- sending, at the network interface, the SMS message with the connectivity solution to the connectivity issue to the specific station.

2. The method of claim 1, wherein retrieving the error log comprises:
- querying error logs using the MAC address of the station;
- identifying network devices associated with the station MAC address; and
- querying the error log of the identified network devices apart from the MAC address station.

3. The method of claim 1, further comprising:
- sending an SMS group message for group chat including the station and a network administrator device.

4. The method of claim 1, further comprising:
- subsequent to sending the connectivity solution SMS message, sending an SMS to the station requesting confirmation that connectivity solution was successful.

5. The method of claim 1, further comprising:
- automatically applying the connectivity solution.

6. The method of claim 1, wherein the connectivity solution comprises at least one of:
- invalid credentials;
- try later due to maximum number of connections being reached; and
- try a different location.

7. A non-transitory computer-readable medium storing code, in a network manager of a data communication network, for using machine learning for automatically resolving user Wi-Fi connectivity issues over SMS (short messaging service), the method comprising the steps of:
- receiving error logs, at a network interface of the network device manager, from a plurality of network devices on the data communication network, including a specific access point associated with the connectivity issue;
- using machine learning of the received error logs to determine connectivity solutions to connectivity issues;
- receiving, at the network interface, an SMS message including a MAC address for a specific station having a connectivity issue involving the specific access point;
- converting, with a processor of the network manager device coupled to the network interface, the SMS message according to an API (application programming interface) of the network manager;
- retrieving error logs based on the converted SMS message according to the MAC address, wherein the retrieved error logs comprise connectivity issues of stations on the Wi-Fi portion of the data communication network other than the specific station;
- based on the error logs from stations other than the specific station, looking up a connectivity solution to the connectivity issue for the specific station;
- converting the connectivity solution from the network manager API to an SMS message; and
- sending, at the network interface, the SMS message with the connectivity solution to the connectivity issue to the specific station.

8. A network manager of a data communication network, for using machine learning for automatically resolving user Wi-Fi connectivity issues over SMS (short messaging service), comprising:
- a processor;
- a network interface;
- a memory;
- an SMS gateway to receive error logs, from a plurality of network devices on the data communication network, including a specific access point associated with the connectivity issue, and the SMS gateway to receive an SMS message including a MAC address for a station having a wireless connectivity issue involving a Wi-Fi portion of the data communication network,
- wherein the SMS gateway converts the SMS message according to an API (application programming interface) of the network manager;
- an error log module to retrieve error logs according to the MAC address;
- a machine learning engine to, based on the error logs, determine connectivity solutions to connectivity issues, and then in real-time determine a connectivity solution to the connectivity issue,
- wherein the processor retrieves error logs comprising connectivity issues of stations on the Wi-Fi portion of the data communication network other than the specific station, and looks up a connectivity solution to the connectivity issue for the specific station, based on the error logs from stations other than the specific station,
- wherein the SMS gateway converts the connectivity solution from the network manager API to an SMS message, and
- wherein the SMS gateway sends the SMS message with the connectivity solution to the connectivity issue to the specific station.

* * * * *